Dec. 23, 1969     I. I. LAZINSKY     3,484,989
LAWN EDGING STRIP
Filed Dec. 13, 1967
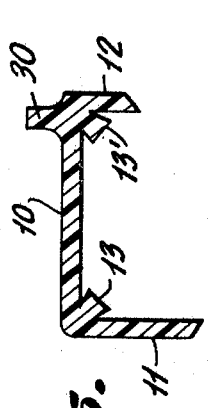
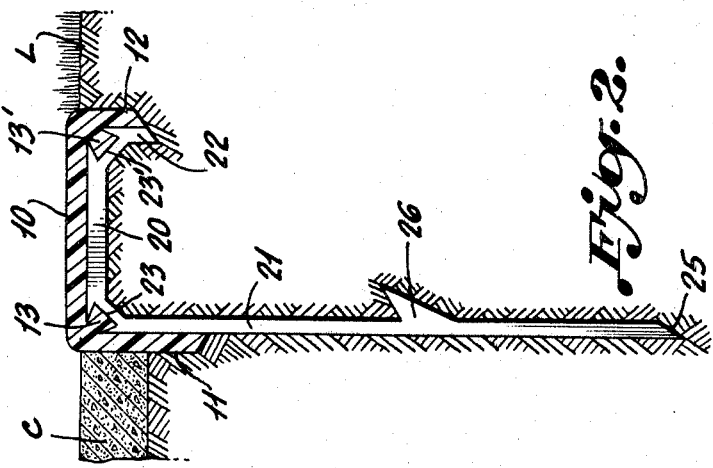
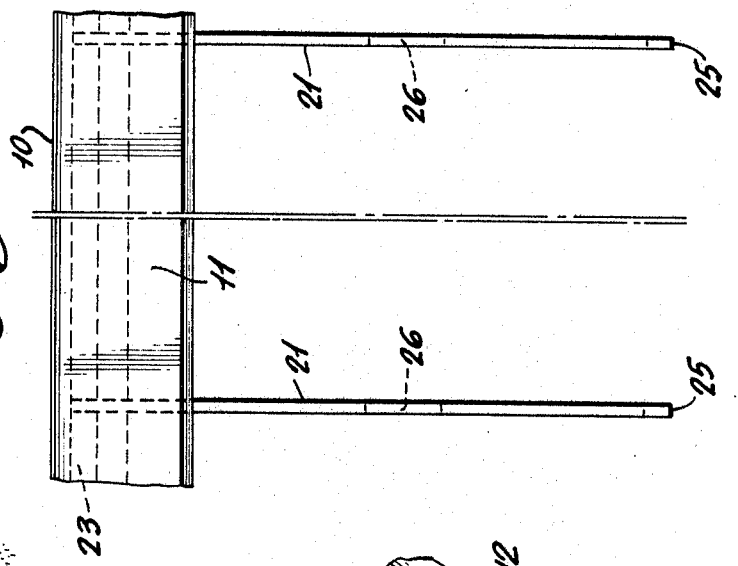
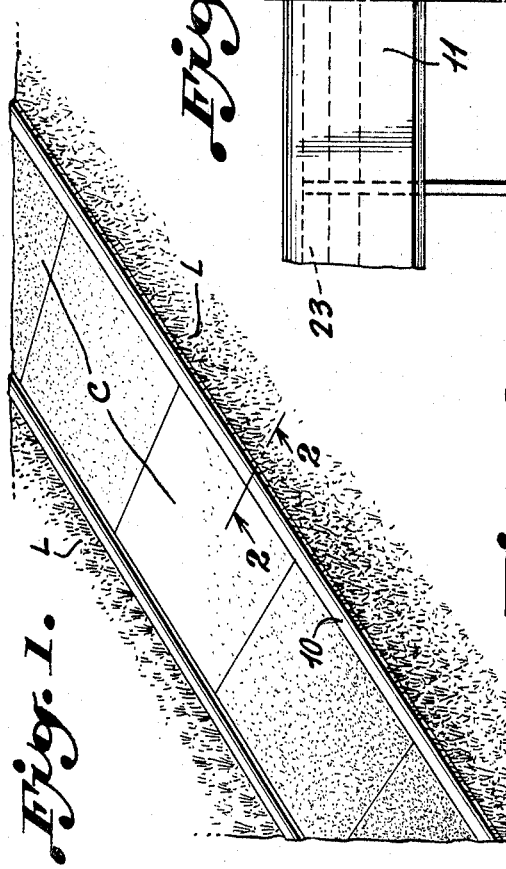
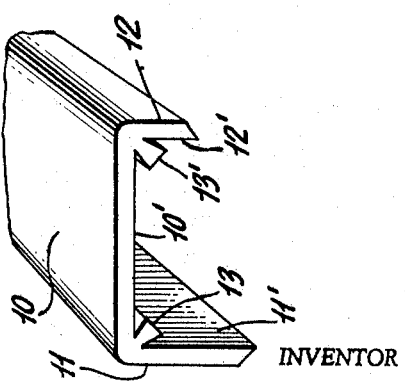
INVENTOR
IRVIN I. LAZINSKY
BY
ATTORNEY

10

United States Patent Office 3,484,989
Patented Dec. 23, 1969

3,484,989
LAWN EDGING STRIP
Irvin I. Lazinsky, 9 S. Central Ave.,
Baltimore, Md. 21202
Filed Dec. 13, 1967, Ser. No. 690,278
Int. Cl. A01g 1/08
U.S. Cl. 47—33                                    13 Claims

ABSTRACT OF THE DISCLOSURE

The invention concerns a lawn edging strip of plastic material, which is preferably colored green, and which is adapted to be fixed on the ground at the boundary lines of grass lawns, to give the latter an esthetic appearance at the junction areas thereof with flower or ornamental beds, or with a pavement, concrete walk, steps or the like. The strip also serves to facilitate the mowing of the lawn and to reduce the extent of the edging operations which are required to be executed by hand or power-operated tools. The edging strip is preferably formed from a continuous strip of extruded plastic provided with integrally molded protuberances which interengage spaced bracket supports which are driven into the ground, and which serve to dispose the top plane of the strip at the grass level adjacent to the edges of the flower beds or the paths or walks of hard material.

BACKGROUND OF THE INVENTION

It is the object of the present invention to provide a lawn edging strip of rugged and simple construction and one which may be produced economically by extrusion procedures. The edging strip, of inverted channel outline, is fixed to the ground through the intermediary of supporting brackets which interengage the edging strip and which may be impaled into the ground to impart a finished appearance to a lawn at the junction portion thereof with a pavement, walkways, steps, etc. The structural assembly in accordance with the invention is much simpler and more economical than that disclosed in Patent No. 3,041,781, July 3, 1962, and constitutes a great commercial improvement thereover.

SUMMARY OF THE INVENTION

The invention contemplates the extrusion of plastic material, such as synthetic rubber, neoprene, polyethylene, etc., and simultaneously forming at least one continuous extrusion protuberance which may interengage with supporting brackets of metal, plastic or any other hard material which are formed with recesses of the same cross-section as the protuberance on the lawn edging strip. Depending upon the relative flexibility of the lawn edging strip, the interengagement of the supporting brackets with the edging strip may be effected by flexing the strip with the one or more protuberances therein into the recesses on the brackets, or threading the latter onto the protuberances from one of the ends of the edging strip.

It is the object of the invention to provide a low cost edging strip produced from a continuous extrusion of plastic material, and interengaging supporting brackets therefor which may also be formed of an extrusion of metal or plastic which are adapted to be cut into short lengths. The supporting bracket is formed with a long leg or bar which is pointed at its bottom end to facilitate its penetration into the ground, as well as a horizontal shelf projecting laterally from the upper end of the bar for providing support for the top surface of the edging strip. In addition, the horizontal support is provided with a downwardly extending lug at its free end to reinforce the bracket support as well as to provide additional surface area for the edging strip. The latter is of inverted channel contour and is extruded with a downwardly extending flange along one edge of relatively small depth corresponding to that of the lug of the bracket support and a flange of greater depth along the opposite edge which abuts the vertical leg of the bracket support which is inserted into the ground.

In the preferred embodiment of the invention, a continuous protuberance is formed at each of the corners between the inner faces of each flange and the lower face of the top which extends angularly for interengagement with corresponding recesses formed at the outer corners of the horizontal support of the bracket and the vertical leg and lug extending downwardly therefrom.

Other objects and purposes will appear from the detailed description of the invention following hereinafter, taken in conjunction with the accompanying drawings, wherein:

FIG. 1 is a perspective view illustrating the use of a lawn edging strip in accordance with the invention at the junction lines between a lawn and a pavement or walkway;

FIG. 2 is a vertical sectional view along line 2—2 of FIG. 1;

FIG. 3 is a left end view of the assembled lawn edging strip and supporting brackets therefor as shown in FIG. 2;

FIG. 4 is a perspective view of a lawn edging strip in accordance with the invention; and FIG. 5 is a sectional view of another embodiment of the invention.

In FIG. 1 is shown a lawn L with a walkway C of hardened material extending thereacross. The walk C may be formed of concrete, stone slabs, bricks, or the like. Alternatively the body C may be the edge of a building, or the edging strip may mark the boundary line between a lawn and a cultivated area for flowers or ornamental beds.

The invention aims to provide a lawn edging strip at the junction line of a lawn and a floral bed, building or walkway, which lends a pleasant appearance thereto, and which facilitates the mowing of the grass of the lawn and minimizes the edging operations which are necessary at the borders.

The edging strip in accordance with the invention may be formed of a continuous extrusion of plastic material which preferably is colored green to blend with the coloring of the lawn L. The extrusion may be of any desired thickness, for example, ⅛″, and is formed of a horizontal top 10 with vertical flanges 11 and 12 extending downwardly from the opposite rounded edges thereof. The width of the top 10 may vary as desired; one having an outside dimension of 1¾″ is adequate. The top may serve as a track for the wheels of a lawn mower, to render unnecessary further cutting and trimming with edging tools. The flange 11 is preferably of greater depth than flange 12. The disposition of the deeper flange 11 adjacent to either a bed of free earth containing plants or flowers, or a solid mass of a building or walkway, prevents the encroachment of grass beyond this flange. This simplifies the mowing and edging operations with shears, snippers or power edgers.

Protuberances 13 and 13′ are formed integrally with the top and flanges and project downwardly from the corners formed between the inner faces 11′ and 12′ of the flanges and the inner face 10′ of the top.

Bracket supports for the edging strip are designed to interengage with the latter at spaced points along the length thereof, as indicated in FIG. 3. These brackets may be formed from a metal extrusion which is cut into short lengths, for example of one inch, following the formation thereof. On the other hand, they may also be formed of hardened plastic or they may be individually molded units of either metal or plastic. Each bracket is formed of a relatively long inner pointed vertical bar 21 having a pointed end 25 at the bottom thereof to facilitate its penetration into the ground. A substantially horizontal support extends laterally from the upper end of the bar 21 and a lug 22 extends downwardly from the free end of the bar 20 which serves to reinforce the bracket support and provide stability to the horizontal support 20.

Recesses 23 and 23' extend upwardly and outwardly from the opposite corners of the bracket support at the junctions of the horizontal support 20 and vertical members 21 and 22. The cross-section of these recesses correspond to that of the protuberances in the edging strip so that upon their interengagement, the bracket provides a tight mode of interfiting the edging strip with the supports, while permitting their separation either by a lateral flexing of the protuberances from the recesses or by the withdrawal of the bracket supports from an end of the edging strip.

While the drawings show a dovetail cross-section of the protuberances 13 and 13' at the opposite corners of the interior of the edging strip and correspondingly shaped recesses in the bracket support, the cross section of these protuberances and recesses or grooves may assume different shapes such as circular, polygonal, etc. If desired, the shape of the protuberance and recess at one corner of the unit may be different from that at the opposite corner. In some instances, a single protuberance projecting from the inner face 10' may be sufficient.

In FIG. 2 is shown the lawn edging strip as the same is fixed in the ground. At least one upwardly pointing barb 26 is formed on the vertical leg 21 of the bracket in order to anchor the same more securely into the ground. The lawn edging strip with the longer flange 11 is disposed adjacent to the long leg 21 of the bracket which preferably is disposed adjacent to the walkway while the short flange 12 of the edging strip is disposed adjacent to the lug 22 of the bracket remote from the walk C.

The substantial area of contact between the exterior surface of the bracket and the interior surface areas of the edging strip supplement the action of the protuberances engaging the recesses in the brackets to provide an effective and tight fit between the edging strip and the supports therefor, which retains its effectiveness for long periods of time while permitting disengagement of the parts when this is desired.

The edging strip shown in FIGS. 1 to 4 is effective in preventing grass roots from taking hold under the edging strip, and those that do are cut easily by the lawn mower when the same is run over the edging strip, which may serve as a track therefor. To enhance further the ease of cutting the grass at the edging strip, the latter may be molded with an upstanding flange 30, at the edge of top 10 adjacent to the short flange 11, as shown in the embodiment illustrated in FIG. 5. Any grass tending to grow from the lawn L over the top of the strip would be curled upwards by the flange 30, and would be guided into the path of the cutting blades of the lawn mower.

While I have described my invention as embodied in specific forms and as operating in specific manners for purposes of illustration, it should be understood that I do not limit my invention thereto, since various modifications will suggest themselves to those skilled in the art without departing from the spirit of my invention, the scope of which is set forth in the annexed claims.

I claim:
1. A lawn edging strip of inverted channel contour and consisting of a length of plastic material having a substantially horizontal top and vertical flanges extending downwardly from the opposite edges thereof, a continuous protuberance projecting from the inner face of said top and a plurality of spiked brackets for supporting said strip, each having a narrow pointed vertical bar for penetration into the ground, a substantially horizontal support for the inner face of said top having one end thereof projecting laterally from the upper end of said bar and an integral lug projecting downwardly from the opposite end of said support, and each support having a recess therein conforming to the cross-section of said protuberance and adapted for interlocking engagement therewith.

2. A device as set forth in claim 1 including an additional flange extending upwardly from the horizontal top along one edge thereof for guiding away the grass of the lawn from the top of said edging strip.

3. A lawn edging strip comprising a length of plastic material having a substantially horizontal top and integral vertical flanges extending downwardly from the opposite edges thereof, a continuous protuberance projecting angularly from each corner formed between the inner faces of each flange and the edge of the inner face of said top adjacent thereto, and a plurality of spiked brackets for supporting said strip, each having a narrow pointed vertical bar for penetration into the ground, a substantially horizontal support for the inner face of said top having one end thereof projecting laterally from the upper end of said bar and an integral lug projecting downwardly from the opposite end of said support, and each support having recesses at the opposite ends thereof conforming to the cross-section of said protuberances and adapted for interlocking engagement therewith.

4. A device as set forth in claim 3 wherein the protuberances extending from the inner corners of said strip are of identical cross-section.

5. A device as set forth in claim 3 wherein the protuberances extending from the inner corners of said strip are of dovetail cross-section.

6. A device as set forth in claim 3 wherein the vertical flanges extending downwardly from the opposite edges of the top of the edging strip are of unequal depth.

7. A device as set forth in claim 3 wherein the flange of greater depth overlies the vertical bar of each spiked support.

8. A device as set forth in claim 7 including an additional flange extending upwardly from the horizontal top along the edge thereof overlying the downwardly extending flange of lesser depth for guiding away the grass of the lawn from the top of said edging strip and upwardly into the path of the mower blades.

9. A device as set forth in claim 3 wherein the pointed vertical bar is provided with an upwardly directed barb between the pointed end and support at the top thereof.

10. A device as set forth in claim 3 wherein the upper portion of said spiked brackets conform closely to the contours of the inner faces of said strip.

11. A device as set forth in claim 3 wherein said lawn edging strip is derived from a continuous length of extruded plastic material.

12. A device as set forth in claim 11 wherein said plurality of spiked brackets of small width are cut from a continuous length of hardened extruded material.

13. A device as set forth in claim 12 wherein said spiked brackets are derived from extruded metal.

References Cited

UNITED STATES PATENTS

| 1,139,515 | 5/1915 | Haas. | |
| 1,977,021 | 10/1934 | Spencer | 47—33 |
| 2,713,751 | 7/1955 | Hendrixson | 47—33 |
| 3,281,988 | 11/1966 | Cohen | 47—33 |
| 3,314,193 | 4/1967 | Chancellor | 47—33 |
| 3,378,949 | 4/1968 | Dorris | 47—33 |

ROBERT E. BAGWILL, Primary Examiner

U.S. Cl. X.R.

94—31